US011572486B2

(12) United States Patent
Aida et al.

(10) Patent No.: US 11,572,486 B2
(45) Date of Patent: Feb. 7, 2023

(54) TEMPERATURE DETECTION MATERIAL, TEMPERATURE DETECTION INK USING SAME, TEMPERATURE INDICATOR, METHOD FOR MANUFACTURING TEMPERATURE DETECTION MATERIAL, AND PRODUCT MANAGEMENT SYSTEM

(71) Applicant: Hitachi Industrial Equipment Systems Co., Ltd., Tokyo (JP)

(72) Inventors: Kohhei Aida, Tokyo (JP); Shunsuke Mori, Tokyo (JP); Masahiro Kawasaki, Tokyo (JP); Kotaro Araya, Tokyo (JP); Hiroshi Sasaki, Tokyo (JP)

(73) Assignee: Hitachi Industrial Equipment Systems Co., Ltd., Tokyo (JP)

( * ) Notice: Subject to any disclaimer, the term of this patent is extended or adjusted under 35 U.S.C. 154(b) by 708 days.

(21) Appl. No.: 16/469,545

(22) PCT Filed: Nov. 17, 2017

(86) PCT No.: PCT/JP2017/041430
§ 371 (c)(1),
(2) Date: Jun. 13, 2019

(87) PCT Pub. No.: WO2018/110200
PCT Pub. Date: Jun. 21, 2018

(65) Prior Publication Data
US 2019/0300740 A1 Oct. 3, 2019

(30) Foreign Application Priority Data
Dec. 14, 2016 (JP) .............................. JP2016-241854

(51) Int. Cl.
*G01K 11/16* (2021.01)
*G01K 11/12* (2021.01)
(Continued)

(52) U.S. Cl.
CPC .............. *C09D 11/50* (2013.01); *C09D 11/03* (2013.01); *C09D 11/037* (2013.01); *C09D 11/12* (2013.01);
(Continued)

(58) Field of Classification Search
None
See application file for complete search history.

(56) References Cited

U.S. PATENT DOCUMENTS 6,382,125 B1 * 5/2002 Tamura .................... B41M 5/30
374/102
2006/0112851 A1 6/2006 Ono et al.
(Continued)

FOREIGN PATENT DOCUMENTS

CN    1280920 A      1/2001
CN    102193350 A    9/2011
(Continued)

OTHER PUBLICATIONS

Chinese-language Office Action issued in Chinese Application No. 201780077465.9 dated May 7, 2020 with English translation (17 pages).
(Continued)

*Primary Examiner* — Joshua D Zimmerman
(74) *Attorney, Agent, or Firm* — Crowell & Moring LLP

(57) ABSTRACT

An object of the present invention is to provide a temperature detection material that can be manufactured through a simple step and is excellent in handleability. In order to solve the above problem, the temperature detection material according to the present invention includes a temperature-indicating material including a leuco dye, a color developer, and a color eraser and a matrix material; and is characterized in that the matrix material is in a solid state, a melting point of the matrix material is higher than a melting point of the
(Continued)

temperature-indicating material, and a phase separation structure in which the temperature-indicating material disperses in the matrix material is formed.

10 Claims, 6 Drawing Sheets

(51) Int. Cl.
*C09K 9/02* (2006.01)
*G01K 11/06* (2006.01)
*B41M 5/00* (2006.01)
*C09D 11/50* (2014.01)
*C09D 11/037* (2014.01)
*C09D 11/12* (2006.01)
*C09D 11/17* (2014.01)
*C09D 11/328* (2014.01)
*C09D 11/34* (2014.01)
*C09D 11/03* (2014.01)

(52) U.S. Cl.
CPC ............ *C09D 11/17* (2013.01); *C09D 11/328* (2013.01); *C09D 11/34* (2013.01); *C09K 9/02* (2013.01); *G01K 11/06* (2013.01); *G01K 11/12* (2013.01); *G01K 11/16* (2013.01); *B41M 5/00* (2013.01)

(56) References Cited

U.S. PATENT DOCUMENTS

| | | |
|---|---|---|
| 2011/0183248 A1 | 7/2011 | Kabai et al. |
| 2011/0262850 A1 | 10/2011 | Itou et al. |
| 2012/0014740 A1 | 1/2012 | Kamitani et al. |
| 2013/0014690 A1 | 1/2013 | Shirase |

FOREIGN PATENT DOCUMENTS

| | | |
|---|---|---|
| CN | 102236274 A | 11/2011 |
| CN | 102807853 A | 12/2012 |
| CN | 103205250 A | 7/2013 |
| DE | 102 18 057 A1 | 11/2003 |
| EP | 2 554 961 A1 | 2/2013 |
| FR | 2 731 517 A1 | 9/1996 |
| JP | 52-6748 B | 2/1977 |
| JP | 2-19155 B2 | 4/1990 |
| JP | 7-27633 A | 1/1995 |
| JP | 2001-91368 A | 4/2001 |
| JP | 2002-37420 A | 2/2002 |
| JP | 2004-93324 A | 3/2004 |
| JP | 2006-137886 A | 6/2006 |
| JP | 2010-229332 A | 10/2010 |
| JP | 2014-118422 A | 6/2014 |
| WO | WO 2011/125837 A1 | 10/2011 |

OTHER PUBLICATIONS

International Search Report (PCT/ISA/210) issued in PCT Application No. PCT/JP2017/041430 dated Feb. 13, 2018 with English translation (four (4) pages).

Japanese-language Written Opinion (PCT/ISA/237) issued in PCT Application No. PCT/JP2017/041430 dated Feb. 13, 2018 (five (5) pages).

Extended European Search Report issued in European Application No. 17881377.0 dated Nov. 18, 2020 (15 pages).

Japanese-language Office Action issued in Japanese Application No. 2018-556521 dated Apr. 27, 2021 with English translation (eight (8) pages).

\* cited by examiner

TEMPERATURE DETECTION MATERIAL, TEMPERATURE DETECTION INK USING SAME, TEMPERATURE INDICATOR, METHOD FOR MANUFACTURING TEMPERATURE DETECTION MATERIAL, AND PRODUCT MANAGEMENT SYSTEM

TECHNICAL FIELD

The present invention relates to a temperature detection material for checking a temperature of a temperature detection object and the like, a temperature detection ink using it, a temperature indicator, and a product management system.

BACKGROUND ART

Perishable foods, frozen foods, and low temperature storage drugs such as vaccines and biomedicines require a cold chain to keep those products at a low temperature without interruption through a distribution route including production, transportation, and consumption. Actually, a transport container is usually equipped with a data logger capable of continuously recording a time and a temperature in many cases in order to measure and record a temperature constantly during distribution, and it is possible to reveal the whereabouts of the responsibility if a product is damaged. In addition, there is a method of using a temperature indicator when the quality of an individual product is guaranteed. A temperature indicator does not have such a recording accuracy as a data logger but is attachable to an individual product, the surface is colored when the temperature is above or below a preset temperature, and hence the change of a temperature environment can be known. An inexpensive temperature indicator is required, however, in order to be used for quality control of an inexpensive food or drug.

A temperature-indicating agent using a leuco dye is disclosed in Patent Literature 1 as a temperature indicator capable of detecting temperature rise and temperature drop.

A heat-sensitive erasable ink composition using the color developing and erasing mechanism of a leuco dye is disclosed in Patent Literature 2. The heat-sensitive erasable ink contains a leuco dye, a color developer, and color developing particles including a crystalline material as a coloring agent.

A solid writing material using a reversible thermochromic microcapsule pigment enclosing a thermochromic color-memory composition and a styrene-modified polyolefin wax as an excipient is disclosed in Patent Literature 3.

CITATION LIST

Patent Literature

PTL 1: Japanese Examined Patent Application No. Hei 2-19155
PTL 2: Japanese Unexamined Patent Application No. 2010-229332
PTL 3: Japanese Unexamined Patent Application No. 2014-118422

SUMMARY OF INVENTION

Technical Problem

Discoloration reversibility is given to a reversible temperature-indicating agent and a heat-sensitive erasable ink composition disclosed in Patent Literatures 1 and 2 by using the solidification and melt of a meltable material or a crystalline material and controlling the reaction of a leuco dye and an electron-accepting material. The handleability of such a material is a problem because the states of a temperature-indicating agent and an ink composition change in accordance with temperature.

A solid writing material disclosed in Patent Literature 3 encloses an electron-releasing coloring organic compound, an electron-accepting compound, and a thermochromic color-memory composition in a microcapsule pigment. A temperature can be detected in the form of a solid state by segregating the electron-releasing coloring organic compound, the electron-accepting compound, and the thermochromic color-memory composition, all contributing to discoloration characteristics, from a styrene-modified polyolefin wax that is an excipient by a microcapsule wall film. Microencapsulation, however, is essential in Patent Literature 3. A problem here is that it is difficult to manufacture microcapsules of a small average particle diameter and production efficiency is low.

In view of the above situation, an object of the present invention is to provide a temperature detection material that can be manufactured through a simple step and is excellent in handleability.

Solution to Problem

In order to solve the above problem, a temperature detection material according to the present invention: includes a temperature-indicating material including a leuco dye, a color developer, and a color eraser, and a matrix material; and is characterized in that the matrix material is a nonpolar material, the melting point of the matrix material is higher than the melting point of the temperature-indicating material, and a phase separation structure in which the temperature-indicating material disperses in the matrix material is formed.

Advantageous Effects of Invention

The present invention makes it possible to provide a temperature detection material that can be manufactured through a simple step and is excellent in handleability.

DESCRIPTION OF EMBODIMENTS

Figure 1:
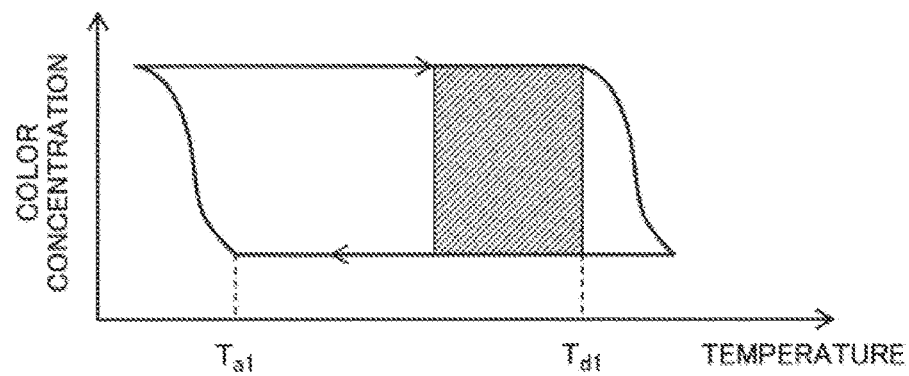
FIG. 1 is a schematic view showing the color density change of a temperature detection material according to Embodiment 1.

Forms for applying the present invention (hereunder referred to as "embodiments") are explained hereunder in detail in reference to drawings appropriately. Here, in the drawings, common parts are represented by an identical reference sign and duplicated explanations are avoided.

Embodiment 1

Figure 2A:
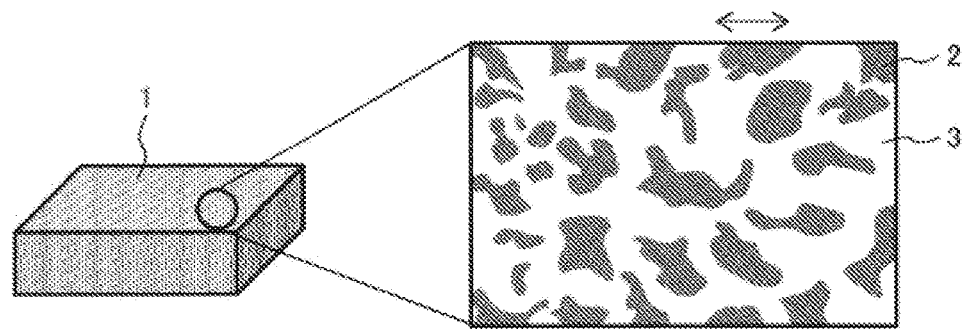
FIGS. 2A and 2B are schematic views showing a phase separation structure of a temperature detection material according to Embodiment 1.
Figure 2B:
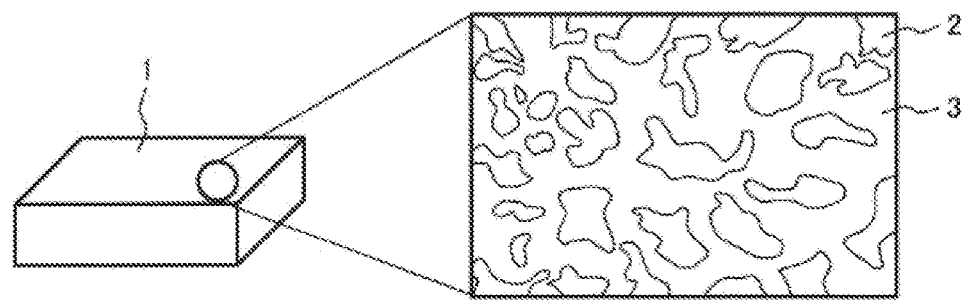

<Temperature Detection Material>
The configuration of a temperature detection material according to Embodiment 1 is explained in reference to FIGS. 1 and 2. The temperature detection material includes a temperature-indicating material and a matrix material.
<Temperature-Indicating Material>
In a temperature-indicating material, a color density changes in accordance with temperature change (temperature rise/temperature drop) and a color density-temperature curve has a hysteresis characteristic. The temperature-indicating material includes a leuco dye that is an electron-releasing compound, a color developer that is an electron-accepting compound, and a color eraser for controlling the temperature range of hysteresis.

An object in the present embodiment is to guarantee the temperature management of a product in the distribution of the product such as a commodity. When a temperature detection material reversibly changing color in accordance with temperature change is used, even if a temperature rises or drops once during distribution and the color of the temperature detection material changes, when the temperature drops or rises again during the distribution, the color returns to the original color and it is impossible to grasp the presence or absence of a change in temperature. Even in a material reversibly changing color (color developing/erasing) in accordance with temperature change, however, as long as the material shows a color-changing hysteresis in which a temperature $T_{d1}$ at which color erasing starts during temperature rise and a temperature $T_{a1}$ at which color developing starts during temperature drop are different from each other, the color hardly returns to the original color and hence the change of the temperature environment can be known.

FIG. 1 is a view showing the color density change of a temperature detection material according to Embodiment 1. In FIG. 1, the vertical axis represents a color density, the horizontal axis represents a temperature, $T_{d1}$ represents a color erasing start temperature, $T_{a2}$ represents a color developing start temperature, and the hatched area represents the range of the management temperature of a product. By adjusting a hysteresis width, in other words by using a temperature detection material having a hysteresis width larger than a management temperature range during transport, it is possible to detect the presence or absence of the change of a temperature environment. When it is to be managed whether or not a product is exposed to a high temperature for example, a temperature detection material that develops a color at a temperature unexpected during distribution and erases the color at a temperature to be detected (the upper limit of a management temperature) can be used. In the case of transport at normal temperature for example, a temperature unexpected during distribution can be set at −20° C. and a temperature to be detected can be set at 30° C.

By using a temperature detection material that is once stored under a low temperature or a high temperature and develops or erases a color in a preliminary stage of transport, it is possible to detect whether or not the temperature has deviated from a management temperature during the transport. Moreover, there are the advantages that the history of temperature rise and temperature drop can be detected, the temperature detection material is reusable even after temperature detection, and a storage temperature before use is not limited.

In addition, it is possible to detect both temperature rise and temperature drop with a single temperature-indicating material.

(Leuco Dye)
A leuco dye is an electron-releasing compound and a material heretofore known as a dye for pressure-sensitive copying paper or a dye for heat-sensitive recording paper can be used. Examples include: a triphenylmethane phthalide system; a fluoran system; a phenothiazine system; an indolylphthalide system; a leucoauramine system; a spiropyran system; a rhodamine lactam system; a triphenylmethane system; a triazene system; a spirophthalanxanthene system; a naphtholactam system; an azomethine system; and the like. Specific examples of the leuco dye include: 9-(N-ethyl-N-isopentyl amino)spiro[benzo[a]xanthene-12,3'-phthalide; 2-methyl-6-(Np-tolyl-N-ethylamino)-fluoran 6-(diethylamino)-2-[(3-trifluoromethyl)anilino]xanthene-9-spiro-3'-phthalide; 3,3-bis(p-diethylaminophenyl)-6-dimethylamino phthalide; 2'-anilino-6'-(dibutylamino)-3'-methylspiro[phthalide-3,9'-xanthene]; 3-(4-diethylamino-2-methylphenyl)-3-(1-ethyl-2-methylindole-3-yl)-4-azaphthalide; and 1-ethyl-8-[N-ethyl-N-(4-methylphenyl) amino]-2,2,4-trimethyl-1,2-dihydrospro[11H-chromeno[2,3-g]quinoline-11,3'-phthalide.

A temperature-indicating material may be used by combining two or more leuco dyes.

(Color Developer)
A color developer develops a color by touching an electron-releasing leuco dye and thus changing the structure of the leuco dye. As a color developer, a material known as a color developer and used for heat-sensitive recording paper or pressure-sensitive copying paper can be used. Specific examples of such a color developer include phenols such as: benzyl 4-hydroxybenzoate; 2,2'-biphenol; 1,1-bis(3-cyclohexyl-4-hydroxyphenyl)cyclohexane; 2,2-bis(3-cyclohexyl-4-hydroxyphenyl)propane; bisphenol bisphenol F; bis(4-hydroxyphenyl)sulfide; parahydroxybenzoates; gallic acid ester; and the like. The color developer is not limited to those materials and any compound is acceptable as long as it is an electron acceptor and can change the color of a leuco dye. Further, metallic salts of carboxylic acid derivatives; salicylic acids and salicylic acid metallic salts; sulfonic acids; sulfonates; phosphoric acids; phosphoric acid metallic salts; acidic phosphoric acid esters; acidic phosphoric acid ester metallic salts; phosphorous acids; phosphorous acid metallic salts; and the like may also be used. In particular, a material highly compatible with a leuco dye and a color eraser that will be described later is preferably used and organic color developers such as 2,2'-bisphenol, bisphenol A, gallate, and the like are preferably used.

A temperature-indicating material according to the present embodiment may include one kind, or a combination of two or more kinds of color developers. By combining color developers, the color density of a leuco dye can be adjusted during color developing. The quantity of a used color developer is selected in accordance with a desired color density. For example, a color developer may usually be selected in the range of about 0.1 to 100 parts by weight with respect to leuco dye of 1 part weight.

(Color Eraser)

As a color eraser, a material capable of dissociating a bond between a leuco dye and a color developer can be used widely. Various materials can be a color eraser as long as the material has a low polarity and does not develop a color with a leuco dye but has a high polarity to the extent of dissolving the leuco dye and a color developer. Typically various kinds of organic compounds can be used such as: hydroxy compounds; ester compounds; peroxy compounds; carbonyl compounds; aromatic compounds; aliphatic compounds; halogen compounds; amino compounds; compounds; N-oxide compounds; hydroxyamine compounds; nitro compounds; azo compounds; diazo compounds; azides; ether compounds; oil compounds; saccharide compounds; peptide compounds; nucleic acid compounds; alkaloid compounds; steroid compounds; and the like.

Specifically there can be named: ester compounds including tricaprin; isopropyl myristate; m-tolyl acetate; diethyl sebacate; dimethyl adipate; 1,4-diacetoxybutane; decyl decanoate; diethyl phenylmalonate; diisobutyl phthalate; triethyl citrate; benzyl butyl phthalate; butyl phthalyl butyl glycolate; methyl N-methylanthranilate; ethyl anthranilate; 2-hydroxyethyl salicylate; methyl nicotinate; butyl 4-aminobenzoate; methyl p-toluate; ethyl 4-nitrobenzoate; 2-phenylethyl phenyl acetate; benzyl cinnamate; methyl acetoacetate; geranyl acetate; dimethyl succinate; dimethyl sebacate; diethyl oxaloacetate; monoolein; butyl palmitate; ethyl stearate; methyl palmitate; methyl stearate; linalyl acetate; di-n-octyl phthalate; benzyl benzoate; diethylene glycol dibenzoate; methyl p-anisate; m-tolyl acetate; cinnamyl cinnamate; 2-phenylethyl propionate; butyl stearate; ethyl myristate; methyl myristate; methyl anthranilate; neryl acetate; isopropyl palmitate; ethyl 4-fluorobenzoat; cyclandelate (isomer mixture); butopyronoxyl; ethyl 2-bromopropionate; tricaprylin; ethyl levulinate; hexadecyl palmitate; tert-butyl acetate; 1,1-ethanediol diacetate; dimethyl oxalate; tristearin; methyl acetylsalicylate; benzal diacetate; methyl 2-benzoylbenzoate; ethyl 2,3-dibromobutyrate; ethyl 2-furancarboxylate; ethyl acetopyruvate; ethyl vanillate; dimethyl itaconate; methyl 3-bromobenzoate; monoethyl adipate; dimethyl adipate; 1,4-diacetoxy butane; diethylene glycol diacetate; ethyl palmitate; diethyl terephthalate; phenyl propionate; phenyl stearate; 1-naphthyl acetate; methyl behenate; methyl arachidate; methyl 4-chlorobenzoate; methyl sorbate; ethyl isonicotinate; dimethyl dodecanedioate; methyl heptadecanoate; ethyl α-cyanocinnamate; N-phenylglycine ethyl; diethyl itaconate; methyl picolinate; methyl isonicotinate; methyl DL-mandelate; methyl 3-aminobenzoate; methyl 4-methylsalicylate; diethyl benzylidenemalonate; isoamyl DL-mandelate; triethyl methanetricarboxylate; diethyl formaminomalonate; 1,2-bis (chloroacetoxy) ethane; methyl pentadecanoate; ethyl arachidinate; ethyl 6-bromohexanoate; monoethyl pimelate; hexadecyl lactate; ethyl benzilate; mefenpyr-diethy; procaine; dicyclohexyl phthalate; 4-tert-butylphenyl salicylate; isobutyl 4-aminobenzoate; butyl 4-hydroxybenzoate; tripalmitin; 1,2-diacetoxy benzene; dimethyl isophthalate; monoethyl fumarate; methyl vanillate; methyl 3-amino-2-thiophenecarboxylate; etomidate; cloquintocet-mexyl; methyl benzilate; diphenyl phthalate; phenyl benzoate; propyl 4-aminobenzoate; ethylene glycol dibenzoate; triacetin; ethyl pentafluoropropionate; methyl 3-nitrobenzoate; 4-nitrophenyl acetate; methyl 3-hydroxy-2-naphthoate; trimethyl citrate; ethyl 3-hydroxybenzoate; methyl 3-hydroxybenzoate; trimebutine; 4-methoxybenzyl acetate; pentaerythritol tetra-acetate; methyl 4-bromobenzoate; ethyl 1-naphthaleneacetate; 5-nitro-2-furaldehyde diacetate; ethyl 4-aminobenzoate; propyl paraben; 1,2,4-triacetoxybenzene; methyl 4-nitrobenzoate; diethyl acetamidomalonate; valethamate bromide; 2-naphthyl benzoate; dimethyl fumarate; ajifenin hydrochloride; benzyl 4-hydroxybenzoate; ethyl 4-hydroxybenzoate; vinyl butyrate; vitamin K4; methyl 4-iodobenzoate; methyl 3,3-dimethylacrylate; propyl gallate; 1,4-diacetoxy benzene; diethyl meso oxalate; dimethyl 1,4-cyclohexanedicarboxylate (cis-, trans-mixture); triethyl 1,1,2-ethane tricarboxylate; dimethyl hexafluoroglutanate; amyl benzoate; ethyl 3-bromobenzoate; ethyl 5-bromo-2-chlorobenzoate; bis(2-ethylhexyl) phthalate; diethyl allylmalonate; diethyl bromomalonate; diethyl ethoxymethylenemalonate; diethyl ethylmalonate; diethyl fumarate; diethyl maleate; diethyl malonate; diethyl phthalate; dimethyl 1,3-acetonedicarboxylate; dimethyl phthalate; ethyl 3-aminobenzoate; ethyl benzoate; ethyl 4-(dimethylamino)benzoate; ethyl nicotinate; ethyl phenylpropiolate; ethyl pyridine-2-carboxylate; ethyl 2-pyridylacetat; ethyl 3-pyridylacetate; methyl benzoate; ethyl phenylacetate; amyl 4-hydroxybenzoate; 2,5 diacetoxy toluene; ethyl 4-oxazolecarboxylate; trimethyl 1,3,5-cyclohexanetricarboxylate (cis-, trans-mixture); methyl 3-(chlorosulfonyl)-2-thiophenecarboxylate; pentaerythritol distearate; benzyl laurate; diethyl acetylenedicarboxylate; phenyl methacrylate; benzyl acetate; dimethyl glutarate; ethyl 2-oxocyclohexanecarboxylate; ethyl phenylcyanoacetate; ethyl 1-piperazinecarboxylate; methyl benzoylformate; methyl phenylacetate; phenyl acetate; diethyl succinate; tributyrin; diethyl methylmalonate; dimethyl oxalate; diethyl 1,1-cyclopropanedicarboxylate; dibenzyl malonate; methyl 4-tert-butylbenzoate; ethyl 2-oxocyclopentanecarboxylate; methyl cyclohexanecarboxylate; ethyl 4-methoxyphenylacetate; methyl 4-fluorobenzoylacetate; dimethyl maleate; methyl terephthalaldehydate; ethyl 4-bromobenzoate; methyl 2-bromobenzoate; methyl 2-iodobenzoate; ethyl 3-iodobenzoate; ethyl 3-furancarboxylate; diallyl phthalate; benzyl bromoacetate; dimethyl bromomalonate; methyl m-toluate; diethyl 1,3-acetonedicarboxylate; methyl phenylpropiolate; 1-naphthyl butyrate; ethyl o-toluate; methyl 2-oxocyclopentanecarboxylate; isobutyl benzoate; ethyl 3-phenylpropionate; di-tert-butyl malonate; dibutyl sebacate; diethyl adipate; diethyl terephthalate; dipropyl phthalate; 1,1-ethanediol diacetate; diisopropyl adipate; diisopropyl fumarate; ethyl cinnamate; 2-ethylhexyl 2-cyano-3,3-diphenylacrylate; neopentyl glycol diacrylate; triolein; ethyl benzoylacetate; ethyl p-anisate; diethyl suberate; sorbitan tristearate; sorbitan monostearate; amide stearate; glycerol monostearate; glycerol distearate; 3-(tert-butoxycarbonyl) phenylboronic acid; racecadotril; 4-[6-acryloyloxy)hexyloxy]-4'-cyanobiphenyl; 2-(dimethylamino)vinyl 3-pyridyl ketone; stearyl acrylate; ethyl 4-bromophenylacetate; dibenzyl phthalate; methyl 3,5-dimethoxybenzoate; eugenol acetate; didodecyl 3,3'-thiodipropionate; vanillin acetate; diphenyl carbonate; ethyl oxanilate; methyl terephthalaldehydate; dimethyl 4-nitrophthalate; ethyl (4-nitrobenzoyl)acetate; dimethyl nitroterephthalate; methyl 2-methoxy-5-(methylsulfonyl) benzoate; methyl 3-methyl-4-nitrobenzoate; dimethyl 2,3-naphthalenedicarboxylate; bis(2-ethylhexyl) adipate; 4'-acetoxyacetophenone; ethyl trans-3-benzoylacrylate; ethyl coumarin-3-carboxylate; BAPTA tetraethyl ester; methyl 2,6-dimethoxybenzoate; di-tert-butyl iminodicarboxylate;

benzyl p-benzyloxybenzoate; methyl 3,4,5-trimethoxybenzoate; methyl 3-amino-4-methoxybenzoate; diethylene glycol distearate; ditetradecyl 3,3-thiodipropionate; ethyl 4-nitrophenylacetate; methyl 4-chloro-3-nitrobenzoate; 1,4 dipropionyl oxybenzene; dimethyl terephthalate; ethyl 4-nitrocinnamate; dimethyl 5-nitroisophthalate; triethyl 1,3,5-benzenetricarboxylate; diethyl N-(4-aminobenzoyl)-L-glutamate; 2-methyl-1-naphthyl acetate; 7-acetoxy-4-methylcoumarin; methyl 4-amino-2-methoxybenzoate; 4,4'-diacetoxybiphenyl; dimethyl 5-aminoisophthalate; diethyl 1,4-dihydro-2,6-dimethyl-3,5-pyridinedicarboxylate; dimethyl 4,4'-biphenyldicarboxylate; and the like: and steroid compounds including cholesterol; cholesteryl bromide; β-estradiol; methylandrostenediol; pregnenolone; cholesterol benzoate; cholesterol acetate; cholesterol linoleate; cholesterol palmitate; cholesterol stearate; cholesterol n-ocanoate; cholesterol oleate; 3-chlorocholestene; cholesterol trans-cinnamate; cholesterol decanoate; cholesterol hydrocinnamate; cholesterol laurate; cholesterol butyrate; cholesterol formate; cholesterol heptanoate; cholesterol hexanoate; hydrogen cholesterol succinate; cholesterol myristate; cholesterol propionate; cholesterol valerate; hydrogen cholesterol phthalate; cholesterol phenylacetate; cholesterol chloroformate; cholesterol 2,4-dichlorobenzoate; cholesterol pelargonate; cholesterol nonyl carbonate; cholesterol heptyl carbonate; cholesterol oleyl carbonate; cholesterol methyl carbonate; cholesterol ethyl carbonate; cholesterol isopropyl carbonate; cholesterol butyl carbonate; cholesterol isobutyl carbonate; cholesterol amino carbonate; cholesterol n-octyl carbonate; cholesterol hexyl carbonate; allylestrenol; altrenogest; 9(10)-dehydronandrolone; estrone; ethinyl estradiol; estriol; estradiol benzoate; β-estradiol 17-shipionato; β-estradiol 17-valerate; β-estradiol; β-estradiol 17-heptanoate; gestrinone; mestranol; 2-methoxy-β-estradiol; nandrolone; (–)-norgestrel; quinestrol; trenbolone; tibolone; stanolone; androsterone; abiraterone; abiraterone acetate; dehydroepiandrosterone; dehydroepiandrosterone acetate; ethisterone; epiandrosterone; 17β-hydroxy-17-methylandrosta-1,4-diene-3-one; methylandrostenediol; methyltestosterone; Δ9(11)-methyltestosterone; 1α-methylandrostane-17β-ol-3-one; 17α-methylandrostane-17β-ol-3-one; stanozolol; testosterone; testosterone propionate; altrenogest; 16-dehydropregnenolone acetate; 16,17-epoxypregnenolone acetate; 11αa-hydroxy progesterone; 17α-hydroxy progesterone caproate; 17α-hydroxy progesterone; pregnenolone acetate; 17α-hydroxy progesterone acetate; megestrol acetate; medroxyprogesterone acetate; pregnenolone acetate; 5β-pregnane-3α,20α-diol; budesonide; corticosterone; cortisone acetate; cortisone; cortexolone; deoxycorticosterone acetate; deflazacort; hydrocortisone acetate; hydrocortisone; hydrocortisone 17-butyrate; 6α-methylprednisolone; prednisolone; prednisone; prednisolone acetate; sodium deoxycholate; sodium cholate; methyl cholate; methyl hyodeoxycholate; β-cholestanol; cholesterol-5α,6α-epoxide; diosgenin; ergosterol; β-sitosterol; stigmasterol; β-sitosterol acetate; and the like. Those compounds may preferably be included from the viewpoint of compatibility with a leuco dye and a color developer. It goes without saying that a color eraser is not limited to those compounds and any material is acceptable as long as the material can dissociate a bond between a leuco dye and a color developer.

Further, such a color eraser may include one kind or a combination of two or more kinds of color erasers. By combining color erasers, a solidifying point and a melting point can be adjusted.

It goes without saying that the color eraser is not limited to those compounds and another material can be named for example.

<Matrix Material>

A matrix material as to be a material not hindering the color developing and erasing performance of a temperature-indicating material when the material is mixed with the temperature-indicating material. A material which itself does not show the color developing performance therefore is desirable. As such a material, a nonpolar material that is not an electron acceptor can be used.

Further, in order to form a phase separation structure in which a temperature-indicating material disperses in a matrix material, a material satisfying the following three conditions has to be used as the matrix material. The three conditions are: a solid state is held at an operating temperature of a temperature detection material; the melting point is higher than the melting point of a temperature-indicating material; and the material has low compatibility with a leuco dye, a color eraser, and a color developer. This is because temperature detection function is hindered in a state where any material of a leuco dye, a color developer, and a color eraser dissolves in a matrix material. Further, by using a matrix material in a solid state at an operating temperature, a temperature detection material is handled easily.

As a matrix material satisfying the above conditions, a material having energy δd caused by dipole interaction among molecules estimated by a Hansen solubility parameter and energy δh caused by hydrogen bond among molecules of 3 or less respectively can preferably be used. Specifically, a material not having a polar group or a material including only hydrocarbon can preferably be used. More specifically, there can be named: wax including a paraffin system, a microcrystalline system, an olefin system, a polypropylene system, a polyethylene system, and the like; a low-molecular weight material and a high-molecular-weight material having many frames including propylene, ethylene, styrene, cycloolefin, siloxane, terpene, and the like; a copolymer of those materials; and the like.

Among those materials, a material forming a molten liquid of low viscosity at a melting point or higher and solidifying easily at the melting point or lower has good handleability. Further, a material dissolving in an organic solvent and solidifying during the volatilization process of the organic solvent also has good handleability. Specifically, there can be named: paraffin wax; microcrystalline wax; polyolefin; terpene resin; and the like.

As polyolefin, low-molecular-weight polyethylene, low-molecular-weight polypropylene, and the like are named for example. The molecular weight and the viscosity in a liquid state of polyolefin are not particularly limited but, when the viscosity is low in a liquid state, fewer air bubbles are included and formability is good. Specifically, a molecular weight of 50,000 or less and viscosity near a melting point of 10 Pa·S or less are desirable, and a molecular weight of 10,000 or less and viscosity near a melting point of 1 Pa·S or less are more desirable.

Further, such a matrix material can be used also by combining several types.

Furthermore, even a matrix material in a liquid state at an operating temperature can be used in a temperature detection material if the matrix material forms a phase separation structure together with a temperature-indicating material. When a matrix material is a liquid of high viscosity, the matrix material is excellent in handleability similarly to a matrix material of a solid state. When a matrix material is high-viscosity liquid however, a temperature-indicating material is not inhibited from precipitating in the matrix material in long-term use and the temperature detection material separates finally into two phases. The long-term stability as a temperature detection material therefore is low.

<Phase Separation Structure>

Schematic views of a phase separation structure of a temperature detection material are shown in FIG. 2. In FIG. 2, (a) is a schematic view of a temperature-indicating material in the state of developing color and (b) is a schematic view of the temperature-indicating material in the state of erasing color. In a temperature detection material 1, a phase separation structure of dispersing a temperature-indicating material 2 in a matrix material 3 is formed. In other words, a structure of dispersing a phase including a leuco dye, a color developer, and a color eraser in a matrix material is formed.

Figure 3A:
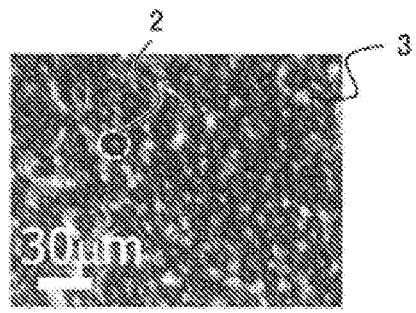
FIGS. 3A and 3B are optical micrographs of a temperature detection material according to Embodiment 1.
Figure 3B:
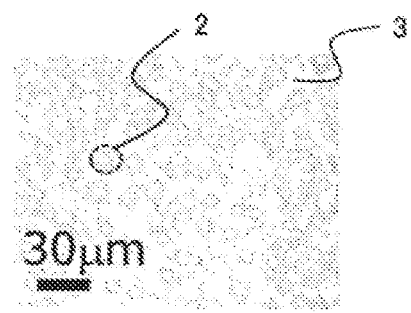

Optical micrographs of a temperature detection material according to the present embodiment are shown in FIG. 3. FIG. 3 represents reflection images of an optical microscope using a halogen lump as the light source. Similarly to FIG. 2, (a) is an optical micrograph of a temperature detection material 1 in which a temperature-indicating material is in the state of developing color and (b) is an optical micrograph of the temperature detection material 1 in which the temperature-indicating material is in the state of erasing color. From the optical micrographs, it is verified that a phase separation structure in which the temperature-indicating material 2 disperses in the matrix material 3 is formed in the temperature detection material 1.

A leuco dye exhibits a colorless or light color usually but develops a color by touching a color developer. A colored leuco dye can be decolored by being overheated under the coexistence with a color developer and a color eraser. Here, a temperature range of a hysteresis depends largely on the melting point and the solidifying point of the color eraser.

A temperature-indicating material according to Embodiment 1 shows a decolored state at a temperature of a melting point or higher and shows a colored state at a temperature of a solidifying point or lower. The discoloration of a temperature-indicating material according to Embodiment 1 therefore is accompanied by phase changes from a solid to a liquid and from a liquid to a solid. In other words, if a factor hindering phase change exists, discoloration ability is lost. Further, if a composition is covered with a material having a color developing effect and a color erasing effect, it is also concerned that the color developing effect and the color erasing effect are lost. For the reason, a method of enclosing a leuco dye, a color developer, and a color eraser individually by microcapsules including a resin film in the combination of the leuco dye, the color developer, and the color eraser is used frequently. By microcapsulation, the environmental resistance of a composition against humidity and the like improves and preservability, discoloration characteristics, and the like can be stabilized. Furthermore, by microcapsulation, it is possible to inhibit a leuco dye, a color developer, and a color eraser from being influenced by other chemical compounds such as a resin agent, an additive, and the like when they are processed into ink, paint, or the like.

The microcapsulation, however, complicates the manufacturing step and leads to raise the price of a temperature detection material. In view of the above situation, the present invention provides a method of producing a solid material through a simple process without microcapsulating a leuco dye, a color developer, and a color eraser.

In a temperature detection material according to Embodiment 1, the melting point of a matrix material is higher than the melting point of a temperature-indicating material and a solid state is kept at a discoloration temperature of the temperature-indicating material. Even when the temperature-indicating material accompanies phase change from a solid to a liquid or from a liquid to a solid and changes color therefore, the temperature detection material remains in a solid state.

Further, a matrix material and a temperature-indicating material are phase-separated from each other, the matrix material does not influence the discoloration of the temperature-indicating material, and hence the temperature detection function of the temperature-indicating material can be kept as it is.

The concentration of a temperature-indicating material enclosed in a matrix material is not particularly limited, but desirably a matrix material of 0.1 to 100 parts by weight is contained with respect to a temperature-indicating material of 1 part by weight. When the concentration of a matrix material is 100 parts or lower by weight with respect to a temperature-indicating material of 1 part by weight, visualization as a temperature detection material can be inhibited from deteriorating. Further, by controlling the concentration of a matrix material so as to be equal to or higher than the concentration of a temperature-indicating material, it is possible to inhibit the matrix material and the temperature-indicating material from forming structures of being connected respectively (hereunder referred to as co-continuous structures). The matrix material and the temperature-indicating material are phase-separated even in the co-continuous structures, hence the function as a temperature detection material is not lost, but the liquid of the temperature-indicating material may sometimes leak from the interior of the matrix material undesirably, and there is the risk of losing long-term stability. The matrix material therefore is more desirably about 1 to 10 parts by weight with respect to the temperature-indicating material of 1 part by weight.

The long diameter of a phase including a temperature-indicating material dispersing in a matrix material may be desirably 100 nm to 1 mm and more desirably 1 µm to 100 µm. The size of a phase including a temperature-indicating material is not particularly limited but, by controlling the size to 100 nm or larger, it is possible to inhibit the interface between the temperature-indicating material and a matrix material from influencing a detection temperature. Further, by controlling the size to 1 mm or smaller, it is difficult to distinguish and visualize a temperature-indicating material and a matrix material and the color unevenness of a temperature detection material can be inhibited. The size of a phase including a temperature-indicating material can be reduced by adding a surfactant or cooling the temperature-indicating material while stirring at a cooling step. Here, the long diameter of a phase including a temperature-indicating material means the long diameter of an approximate ellipse obtained by approximating the phase including the temperature-indicating material to an ellipse.

<Additive>

An additive may be added to a temperature detection material to the extent of not influencing temperature detection function. As an additive, a dye, a pigment, a heat storage capsule, or a conducting agent can be used for example. By adding a dye or a pigment to a temperature detection material, it is possible to adjust a color tone during color developing and/or color erasing. Further, by adding a heat storage material such as a heat storage capsule to a temperature detection material, it is possible to delay the time until the temperature detection material itself reaches a color developing temperature or a color erasing temperature after the exterior of the temperature detection material reaches the color developing temperature or the color erasing temperature. As a result, it is possible to adjust the time until the temperature detection material detects a temperature after the exterior of the temperature detection material deviates from a management temperature. Furthermore, by adding a conducting agent to a temperature detection material, it is possible to give an antistatic effect to the temperature detection material.

<Manufacturing Method of Temperature Detection Material>

A temperature detection material can be manufactured by the following method for example. A method for manufacturing a temperature detection material includes: a mixing step of heating a leuco dye, a color developer, a color eraser, and a matrix material to a temperature not lower than the melting point of the matrix material and mixing the materials; and a step of cooling the mixture obtained at the mixing step to a temperature not higher than the solidifying point of the matrix material. During the cooling process, the matrix material and the temperature-indicating material phase-separate rapidly and a phase separation structure in which a phase including the leuco dye, the color developer, and the color eraser disperses in the matrix material is formed.

When the mixture is heated to a temperature not lower than the melting point of the matrix material and is in a liquid state, the temperature-indicating material and the non-color-developing material may or may not be compatible depending on the compatibility between the temperature-indicating material and the matric material. On this occasion, the case where they are compatible is desirable from the viewpoint of handleability. A temperature-indicating material and a matrix material are required to be phase-separated at an operating temperature at which the matrix material is in a solid state but the materials shall not necessarily be required to be phase-separated in a heated state in which the matrix material is in a state. In order that a temperature-indicating material and a matrix material are phase-separated at an operating temperature and are compatible in a heated state, it is particularly desirable that the polarity of a color eraser of a large content fails within a certain range. If the polarity of the color eraser is too small, the color eraser becomes compatible with the matrix material undesirably at an operating temperature and, if the polarity is too large, the color eraser separates from the matrix material undesirably in a heated state. As a specific calculation method of a polarity, a material having energy $\delta d$ caused by dipole interaction among molecules estimated by a Hansen solubility parameter and energy $\delta h$ caused by hydrogen bond among molecules of 1 to 10 respectively can preferably be used. Even when the polarity of a color eraser is large and a temperature-indicating material and a matrix material are not compatible in a heated state, however, by cooling the materials while stirring, it is possible to form a phase separation structure. Further, it is also possible to add a surfactant and make the materials compatible.

When the materials are cooled to a temperature not higher than the solidifying point of a matrix material and a phase separation structure is formed, the size of the distributed structure of a temperature-indicating material varies depending on the compatibility between the temperature-indicating material and the matrix material. With regard to a color eraser and a matrix material of large contents in particular, they disperse finely when the compatibility is good to some extent and disperse largely when the compatibility is poor. The size of a dispersed structure is not particularly limited, but if the size is 100 nm or smaller, the influence of an interface between a temperature-indicating material and a matrix material appears and hence a detection temperature may be influenced sometimes. Further, if the size is 1 mm or larger, a temperature-indicating material and a matrix material can be visualized respectively and the color unevenness of a temperature detection body increases. The size is therefore desirably 100 nm to 1 mm and particularly most desirably 1 µm to 100 µm. In order to materialize such a dispersed structure too, as a specific method for calculating a polarity, a color eraser having energy $\delta d$ caused by dipole interaction among molecules estimated by a Hansen solubility parameter and energy $\delta h$ caused by hydrogen bond among molecules of 1 to 10 respectively can preferably be used. Further, during the cooling process, by cooling the materials while stirring or adding a surfactant, it is also possible to reduce the size of a dispersed structure.

Embodiment 2

<Temperature Detection Material>

A temperature detection material according to Embodiment 2 has a configuration similar to Embodiment 1 except that a temperature-indicating material is changed to a material that does not crystalize and solidifies in an amorphous state when the material is cooled rapidly from a molten state. A temperature-indicating material used in Embodiment 2 is explained hereunder and the explanation of the configuration similar to Embodiment 1 is omitted.

<Temperature-Indicating Material>

In a temperature-indicating material, a color density changes in accordance with temperature change (temperature rise/temperature drop) and a color density-temperature curve has a hysteresis characteristic. The temperature-indicating material includes a leuco dye that is an electron-releasing compound, a color developer that is an electron-accepting compound, and a color eraser for controlling the temperature range of hysteresis.

Figure 4:
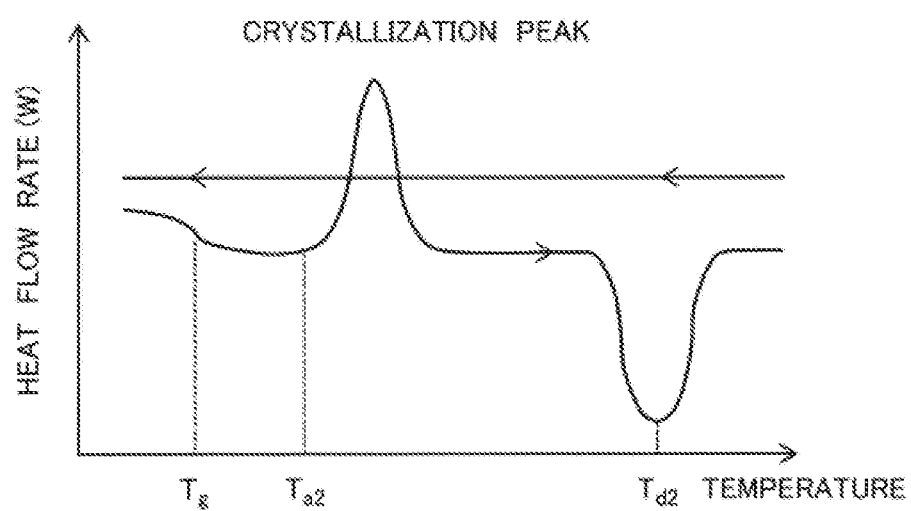
FIG. 4 is a view showing a differential scanning calorimetry curve of a temperature indicating material according to Embodiment 2.

FIG. 4 is a view showing a differential scanning calorimetry (DSC) curve of a temperature-indicating material according to Embodiment 2. A temperature-indicating material according to Embodiment 2 is a material that does not crystallize and solidifies in an amorphous state when the material is cooled rapidly from a molten state. In a cooling process (the leftward arrow (←) in the figure), since crystallization does not occur, an exothermic peak caused by crystallization is not observed. In a heating process (the rightward arrow (→) in the figure) in contrast, an exothermic peak caused by crystallization is observed. $T_{a2}$ represents a start temperature in a heating process (crystallization start temperature in a heating process). $T_{d2}$ represents a melting point.

Figure 5:
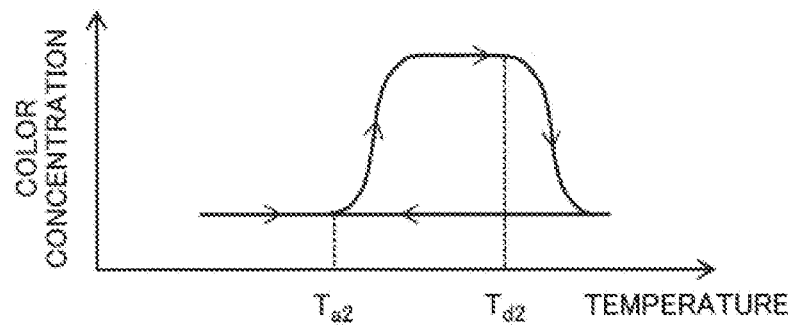
FIG. 5 is a schematic view showing the change of the color density of a temperature-indicating material according to Embodiment 2.

FIG. 5 is a view showing the change of the color density of a temperature-indicating material according to Embodiment 2. As the temperature of a temperature-indicating material rises, the temperature-indicating material crystallizes at a crystallization start temperature $T_{a2}$ in a heating process and thus color development starts. When the temperature continues to rise and reaches the melting point $T_{d2}$, the temperature-indicating material melts and thus decoloration starts. When the temperature-indicating material continues to be cooled in the state of decoloration, the temperature-indicating material is not crystallized and solidifies in an amorphous state and thus the decoloration state is maintained.

The crystallization start temperature in a heating process depends on a heating rate and an elapsed time. When the temperature is raised at a low heating rate, the start temperature appears at a low temperature and, when the temperature is raised at a high heating rate, the start temperature appears at a high temperature or the start temperature does not appear and the temperature-indicating material melts at the melting point $T_{d2}$. Since color develops when crystallization occurs, a start temperature is set in conformity with the requirements of a detection temperature and a detection time for the temperature detection material. For example, a temperature-indicating material of starting crystallization after the lapse of one hour at a certain temperature can be used as a material having the temperature as the start temperature and detecting that one hour has lapsed at the start temperature. Further, $T_g$ represents a glass transition point. Crystallization does not start at the glass transition point or lower. In the case of a material that is likely to be crystalized, crystallization occurs easily at the glass transition point or higher and hence the start temperature and the glass transition point are identical in many cases.

A leuco dye, a color developer, and a color eraser in a temperature-indicating material are explained hereunder.

As a leuco dye, a color developer, and a color eraser, materials similar to Embodiment 1 can be used. In a temperature detection material according to the present embodiment, the phase change temperature of a color eraser is particularly important. A color eraser in a temperature-indicating material used for detecting deviation from an upper limit temperature by forming an amorphous state through rapid cooling is required not to crystallize at a rapid cooling process and amorphize at a temperature near the glass transition point. A hardly crystallizing material is therefore desirable. Almost all materials form amorphous states at a very high rapid cooling rate but, in consideration of practical applicability, a material crystallizing hardly to the extent of forming an amorphous state by rapid cooling in a versatile cooling system is desirable. A material crystallizing hardly to the extent of forming an amorphous state during the course of cooling naturally from the state of melting at the melting point or higher is the most desirable. As such a condition, a color eraser of forming an amorphous state when the color eraser is cooled from the melting point up to the glass transition point at a rate of 1° C./min or more is desirable and a color eraser of forming an amorphous state when the color eraser is cooled from the melting point up to the glass transition point at a rate of 20° C./min or more is the most desirable.

As a color eraser in a temperature-indicating material used for detecting deviation from a lower limit temperature by going into a supercooling state and existing in a liquid state at a melting point or lower, it is desirable that the temperature range in the supercooling state is large, in other words, that the temperature difference between the solidifying point and the meting point of the color eraser is large. Here, a melting point or a solidifying point depends on a targeted temperature control range.

In order to initialize function, the temperatures of a color eraser in a temperature-indicating material used for detecting deviation from an upper limit temperature and a color eraser in a temperature-indicating material used for detecting deviation from a lower limit temperature have to be raised to the melting points or higher respectively. A temperature for initializing function: has to be high to the extent of not likely to occur in the vicinity of a management temperature; but, in consideration of practical applicability, is desirably in a temperature range that can be attained by heating in a versatile heating system. Further, as a temperature detection material, a matrix material and a base material for an indicator are used for protecting a temperature-indicating material and hence the thermal resistance of the materials also has to be taken into consideration. Specifically, about 40° C. to 200° C. is desirable and about 60° C. to 150° C. is most desirable.

Embodiment 3

<Temperature Detection Indicator>

A temperature indicator using a temperature detection material according to Embodiment 1 or Embodiment 2 is explained hereunder. A temperature detection indicator according to the present embodiment includes a base material and a temperature detection material. The base material includes a continuous porous material and the temperature detection material is impregnated in the continuous porous material.

By impregnating a temperature detection material in a continuous porous material, workability can be changed. The workability depends on the material quality of the continuous porous material.

A continuous porous material requires such material quality as not to be denatured even when a temperature detection material touches the continuous porous material for a long period of time. Specifically, therefore, a material hardly dissolvable in an ordinary organic solvent, such as polyethylene, polypropylene, cellulose, or the like, is suitable. As an inorganic compound, silicon dioxide is also suitable.

As the structure of a continuous porous material, a sponge, a nonwoven fabric, a woven fabric, or the like is named. In the case of cellulose, paper used when a book or a document is made is also acceptable. It is also possible to: form a continuous porous body by holding powder of silicon dioxide, polyethylene, or polypropylene with a binder of a similar chemical structure; and use the continuous porous body. As the density of voids in a continuous porous body increases, the density for the penetration of a temperature detection material also increases. A color density therefore can be inhibited from reducing.

<Manufacturing Method of Temperature Detection Indicator>

A temperature indictor can be manufactured by the following method. A leuco dye, a color developer, a color eraser, and a matrix material are mixed and heated to a temperature not lower than the melting point of the matrix material. The temperature detection material heated to a liquid state is impregnated in a continuous porous material. Successively, the materials are cooled to a temperature not higher than the solidifying point of the matrix material.

By the above method, a temperature indicator in which a temperature detection material forms a phase separation structure in the form of being adsorbed in a continuous porous material can be manufactured.

Embodiment 4

<Temperature Detection Ink>

A temperature detection material according to Embodiment 1 or Embodiment 2 can be applied to a temperature detection ink. A temperature detection ink including a temperature detection material according to Embodiment 1 or Embodiment 2 is explained hereunder.

A temperature detection ink includes a temperature detection material and a solvent. The temperature detection ink can be applied to an ink for a pen, a stamp, a crayon, an inkjet, and the like by dissolving or dispersing the temperature detection material in the solvent.

An organic solvent having volatility can be used as the solvent.

In the case of an ink in which a temperature detection material dissolves in a solvent, as an organic solvent having volatility, a solvent having high compatibility with all the materials of a leuco dye, a color developer, a color eraser, and a matrix material has to be used. As an organic solvent therefore, it is preferable to use an organic solvent having a low polarity. Examples of organic solvents having low polarities include: hydrocarbon compounds including hexane, toluene, xylene, benzene, cyclohexane, pentane, and heptane; petroleum products including kerosene and naphtha; fats and oils such as vegetable oil and animal oil; and the like. In an ink including an organic solvent having volatility, a matrix material solidifies and constitutes a phase separation structure together with a temperature-indicating material in the process of volatilizing the solvent by printing, writing, or sealing on a print target etc. and thus only the temperature detection material constitutes a printed matter. The printed matter can be used as a temperature detection indicator.

It is also possible to manufacture an ink solution in which a temperature detection material disperses by: manufacturing the temperature detection material in which a temperature-indicating material disperses in a matrix material beforehand; and mixing the temperature detection material with an organic solvent or water having a high polarity. An organic solvent having poor compatibility with a matrix material enclosing a temperature-indicating material therefore has to be used. As an organic solvent for that, an organic solvent having a high polarity is preferably used. Examples of organic solvents having high polarities include, besides water: alcohols such as glycerin, methanol, ethanol, and propanol; ketones including acetone, methyl ethyl ketone, and cyclohexane; esters such as ethyl acetate, methyl acetate, ethyl propionate, and methyl propionate; ethers such as dimethyl ether and tetrahydrofuran; and the like. The temperature detection ink has a temperature detection function even in a liquid state, further the solvent volatilizes by printing, writing, or sealing on a print target etc., and thus only the temperature detection material constitutes a printed matter. The printed matter can be used as a temperature detection indicator.

In a temperature detection ink, an additive may further be added to the solution of an organic solvent or water as long as the temperature detection function is not affected.

<Manufacturing Method of Temperature Detection Ink>

A temperature detection ink can be manufactured by mixing a leuco dye, a color developer, a color eraser, a matrix material, and a solvent.

Further, when an organic solvent or water having a high polarity is used as a solvent, an ink can also be formed by manufacturing a temperature detection material by the method of Embodiment 1 and dispersing the temperature detection material in a solvent.

<Manufacturing Method of Temperature Detection Material Using Temperature Detection Ink>

A method for manufacturing a temperature detection material using a temperature detection ink includes: a mixing step of mixing a leuco dye, a color developer, a color eraser, a matrix material, and an organic solvent having volatility; and a step of volatilizing the organic solvent from the mixture obtained at the mixing step.

When a temperature detection ink is used, it is unnecessary to heat the mixture to a temperature not lower than the melting point of a matrix material and form a liquid state in the mixing step. A liquid state is formed by dissolving a leuco dye, a color developer, a color eraser, and a matrix material in an organic solvent. Successively, the matrix material and the temperature-indicating material are phase-separated rapidly during the course of volatilizing the organic solvent and a temperature detection material having a phase separation structure in which the temperature-indicating material disperses in the matrix material can be formed.

<Ink for Inkjet>

A temperature detection ink can be applied to an ink for a charge control inkjet printer. The ink for a charge control inkjet printer includes a temperature detection material, a volatile organic solvent, a resin, and a conducting agent.

When the resistance of an ink solution is high, ink particles tend to bend, without flying straight, at the ink discharge port of a charge control inkjet printer. The resistance of an ink solution therefore has to be controlled to about 2,000 $\Omega$cm or less.

A resin, a pigment, and an organic solvent (particularly 2-butane or ethanol used well as an organic solvent of an ink for an inkjet printer) contained in an ink have low conductivities and hence the resistance of the ink solution is as large as about 5,000 to tens of thousands $\Omega$cm. When the resistance is high, a desired printing is hardly obtained by a charge control inkjet printer. In order to reduce the resistance of an ink solution therefore, it is necessary to add a conducting agent to an ink.

As a conducting agent, a complex is preferably used. A conducting agent is required to dissolve in a used solvent and it is also important not to affect a color tone. Further, a conducting agent of a salt structure is generally used. A conducting agent of a salt structure is estimated to be able to exhibit a high conductivity because electrical charge is polarized in a molecule.

As a result of studying from the above point of view, a conducting agent has a salt structure and a tetraalkyl ammonium ion structure is suitable for a cation. An alkyl chain may be an either linear or branched chain and solubility in a solvent improves as a carbon number increases. Resistance can be reduced, however, with a slight addition rate as the carbon number reduces. A practical carbon number used for an ink is about 2 to 8.

As anions, a hexafluorophosphate ion, a tetrafluoroborate ion, and the like are preferable on the point that the ions are highly soluble in a solvent.

Meanwhile, a perchlorate ion is also highly soluble, but is explosive, and is not realistic to be used for an ink. Other than that, chlorine, bromine, and iodine ions are also named but those ions are not preferable because those ions tend to corrode metals such as iron and stainless steel when those ions touch the metals.

From the above, preferable conducting agents include: tetraethylammonium hexafluorophosphate; tetrapropylammonium hexafluorophosphate; tetrabutylammonium hexafluorophosphate; tetrapentylammonium hexafluorophosphate; tetrahexylammonium hexafluorophosphate; tetraoctylammonium hexafluorophosphate; tetraethylammonium tetrafluoroborate; tetrapropylammonium tetrafluoroborate; tetrabutylammonium tetrafluoroborate; tetrapentylammonium tetrafluoroborate; tetrahexylammonium tetrafluoroborate; tetraoctylammonium tetrafluoroborate; and the like.

Embodiment 5

<Temperature Indicator>

Figure 6:
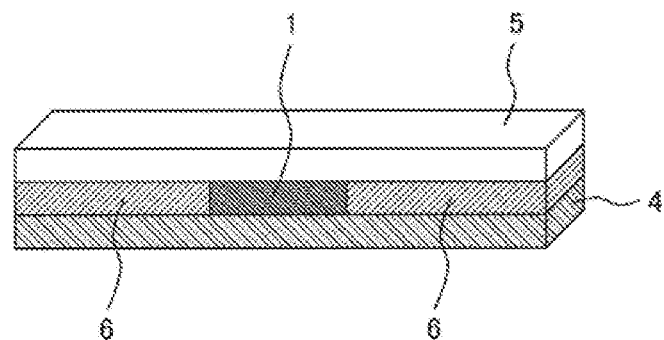
FIG. 6 is a schematic view showing a configuration of a temperature indicator according to an embodiment.

A temperature indicator using a temperature detection material according to Embodiment 1 or Embodiment 2 is explained in the present embodiment. FIG. 6 is a schematic view showing a configuration of a temperature indicator according to the present embodiment. A temperature indicator: includes a base material 4, a temperature detection material 1 arranged over the base material, a transparent base material 5 arranged over the temperature detection material, and a spacer 6; and is configured so as to interpose the temperature detection material between the base material 4 and the transparent base material 5.

The base material and the transparent base material are not particularly limited and any materials are acceptable as long as the transparent base material and the base material interpose the temperature detection material and the discoloration of the temperature detection material can be visualized.

The material of the base material can be selected freely in accordance with a required function. An organic material such as paper or plastics, an inorganic material such as ceramics or a metal, a composite material of those materials, or the like can be selected freely. It is also possible to form a laminated structure with several types of materials. The material is selected in conformity with a characteristic required of a temperature indicator such as high strength, heat resistance, weather resistance, chemical resistance, thermal insulation properties, electrical conductivity, or the like. By adopting the shape of a seal, the temperature indicator can be attached tightly to an object to be detected.

The base material is required to interpose the temperature detection material and hence is preferably larger than the temperature detection body.

The material of the transparent base material can also be selected freely in accordance with required function. An organic material such as paper or plastics, an inorganic material such as ceramics or a metal, a composite material of those materials, or the like can be selected freely. It is necessary to visualize the discoloration at least at a part of the temperature detection material and hence transparency is required. Examples include: organic materials such as highly-transparent paper, highly-transparent plastics such as acryl, polycarbonate, cycloolefin, and the like; highly-transparent inorganic compounds such as glass, a transparent electrode film, and the like; and the like. In addition to those highly-transparent materials, a material with transparency enhanced by reducing the thickness is also acceptable. It is also possible to form a laminated structure with several types of materials. The material is selected from those materials in conformity with a characteristic required of a temperature indicator such as high strength, heat resistance, weather resistance, chemical resistance, thermal insulation properties, electrical conductivity, or the like.

The size of a transparent base material is only required to be able to visualize a temperature detection body and hence is not limited. From the viewpoint of visibility, the short side when the transparent base material is a rectangle and the short diameter when the transparent base material is an ellipse are preferably 30 µm or larger.

As a temperature detection material, a temperature detection material of a solid state or a material formed by impregnating a temperature detection material in a continuous porous material can be used. Further, it is also possible to arrange a temperature detection material over a base material by coating the base material with the temperature detection material in a liquid state heated to a temperature not lower than the melting point of a matrix material and cooling them. Furthermore, it is also possible to arrange a temperature detection material over a base material by coating the base material with the temperature detection material dispersed or dissolved in an organic solvent and volatilizing the solvent.

The spacer 6 is arranged over the base material so as to interpose the temperature detection material from the horizontal directions. The material quality of the spacer 6: is not particularly limited; but can be selected freely for example from organic materials such as paper and plastics, inorganic materials such as ceramics and metals, composite materials of those materials, and the like similarly to the base material and organic materials including highly-transparent paper, highly-transparent plastics such as acryl, polycarbonate, and cycloolefin, highly-transparent inorganic compounds including glass, a transparent electrode film, and the like similarly to the transparent base material; and may be connected to the base material and the transparent base material. Further, it is also possible to use a porous material such as a sponge or an aerogel, a fiber material such as glass wool, rock wool, or cellulose fiber, a foamed material such as urethane, polystyrene, or expanded rubber, or the like, those materials having high thermal insulation properties.

Embodiment 6

<Temperature Indicator>

In the present embodiment, a modified example of a temperature indicator according to Embodiment 3 is explained. The temperature indicator may have another material between a transparent base material and a temperature detection material or over the transparent base material in the range of allowing the temperature detection material to be visualized.

Figure 7:
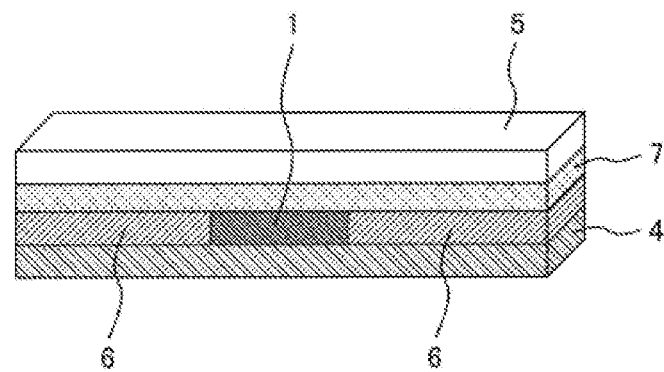
FIG. 7 is a schematic view showing a configuration of a temperature indicator according to an embodiment.

FIG. 7 is a schematic view showing a configuration of a temperature indicator according to the present embodiment. A temperature indicator includes a base material 4, a temperature detection material 1 arranged over the base material, a spacer 6 arranged over the base material so as to interpose the temperature detection material, a transparent base material 5 stacked over the temperature detection material, and a printing paper 7. The printing paper 7 is arranged between the temperature detection material 1 and the transparent base material 5.

The temperature indicator is configured so as to insert the printing paper inside the transparent base material and allow printed information printed on the printing paper to be read. It is, however, necessary to visualize discoloration at least at a part of the temperature detection material. For example, it is possible to: cut at least a part of the printing paper stacked over the temperature detection material; and arrange a part of the temperature detection material where the printing paper is not stacked.

Processing such as drilling a hole may also be applied to the transparent base material and the base material. By drilling a hole, the printing paper between the transparent base material and the spacer is exposed. By adopting such a structure, it is possible to write information on the exposed printing paper in the middle of transport or on other occasions.

Embodiment 7

<Temperature Indicator>

Figure 8:
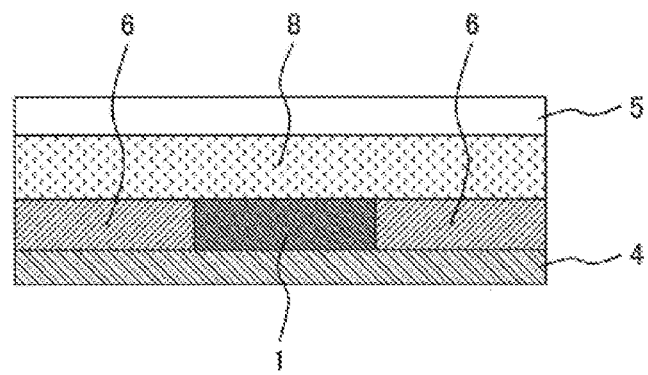
FIG. 8 is a schematic view showing a configuration of a temperature indicator according to an embodiment.

In the present embodiment, a temperature indicator capable of controlling heat conduction is explained. FIG. 8 is a schematic view showing a configuration of a temperature indicator according to the present embodiment. A temperature indicator includes a base material 4, a temperature detection material 1 arranged over the base material, a spacer 6 arranged over the base material so as to interpose the temperature detection material from the horizontal directions, a heat-insulating layer 8 arranged over the temperature detection material 1, and a transparent base material 5.

The heat-insulating layer 8 may be stacked either over or below the temperature detection material 1. As the heat-insulating layer 8, for example, an air layer, a vacuum layer, a porous material such as a sponge or an aerogel, a fiber material such as glass wool, rock wool, or cellulose fiber, or a foamed material such as urethane, polystyrene, or expanded rubber can be used.

By arranging heat-insulating layers 8 over and below a temperature detection material, it is possible to adjust the time until the temperature detection material changes color after the temperature outside the temperature detection material deviates from a management temperature (hereunder referred to as temperature detection time). Further, the temperature detection time can be adjusted by the material types and the thicknesses of the base material and the transparent base material. Furthermore, it is also possible not to install a new heat-insulating layer but to use either the base material or the transparent base material as a heat-insulating layer.

As stated above, by forming a heat-insulating layer and adjusting the material types and thicknesses of a base material and a transparent base material, it is possible to control the thermal conductivity from the base material to a temperature detection material and the thermal conductivity from the transparent base material to the temperature detection material.

When a seal-shaped base material is attached to an object, an ambient temperature is assumed to be different from the temperature of the object surface. When the temperature of the object surface is to be detected, the thermal conductivity from the base material to the temperature detection body should be increased and the thermal conductivity from the transparent base material to the temperature detection body should be reduced. For example, the thermal conductivity of the base material should be higher than the thermal conductivity of the transparent base material by forming a heat-insulating layer over the temperature detection material and adjusting the material types and thicknesses of the transparent base material and the base material. Meanwhile, when ambient temperature is to be detected, the thermal conductivity from the base material to the temperature detection body should be reduced and the thermal conductivity from the transparent base material to the temperature detection body should be increased. For example, the thermal conductivity of the transparent base material should be higher than the thermal conductivity of the base material by forming a heat-insulating layer below the temperature detection material and adjusting the material types and thicknesses of the transparent base material and the base material.

Figure 9:
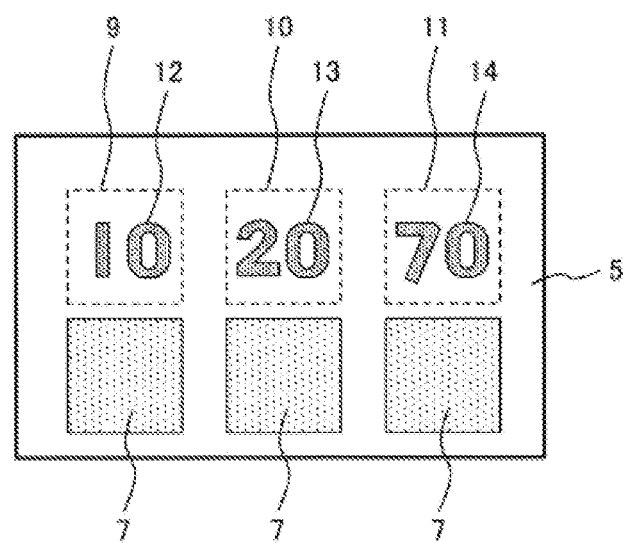
FIG. 9 is a schematic view showing a configuration of a temperature indicator according to an embodiment.

A temperature indicator according to a modified example of Embodiment 7 is explained in reference to FIG. 9. FIG. 9 is a top view of a temperature indicator according to a modified example of Embodiment 7. The temperature indicator uses temperature detection materials 12, 13, and 14 changing the colors at 10° C., 20° C., and 70° C., respectively. The temperature detection material 12 changes the color from blue to white at 10° C. The temperature detection material 13 changes the color from green to white at 20° C. The temperature detection material 14 changes the color from red to white at 70° C. A printing paper 7 is inserted between the temperature detection materials 12, 13, and 14 and a transparent base material. Holes having the shapes of the characters displaying the temperatures at which the temperature detection materials 12, 13, and 14 change the colors were formed in the printing paper 7. By forming the holes in the printing paper 7, the presence or absence of discoloration can be visualized. Holes were formed at three locations in the transparent base material 5. By forming the holes in the transparent base material 5, the printing paper 7 is exposed and a character and the like can be written on the printing paper. That can be used for writing a confirmation time when a color changes or other purposes.

<Quality Control System>

Figure 10:
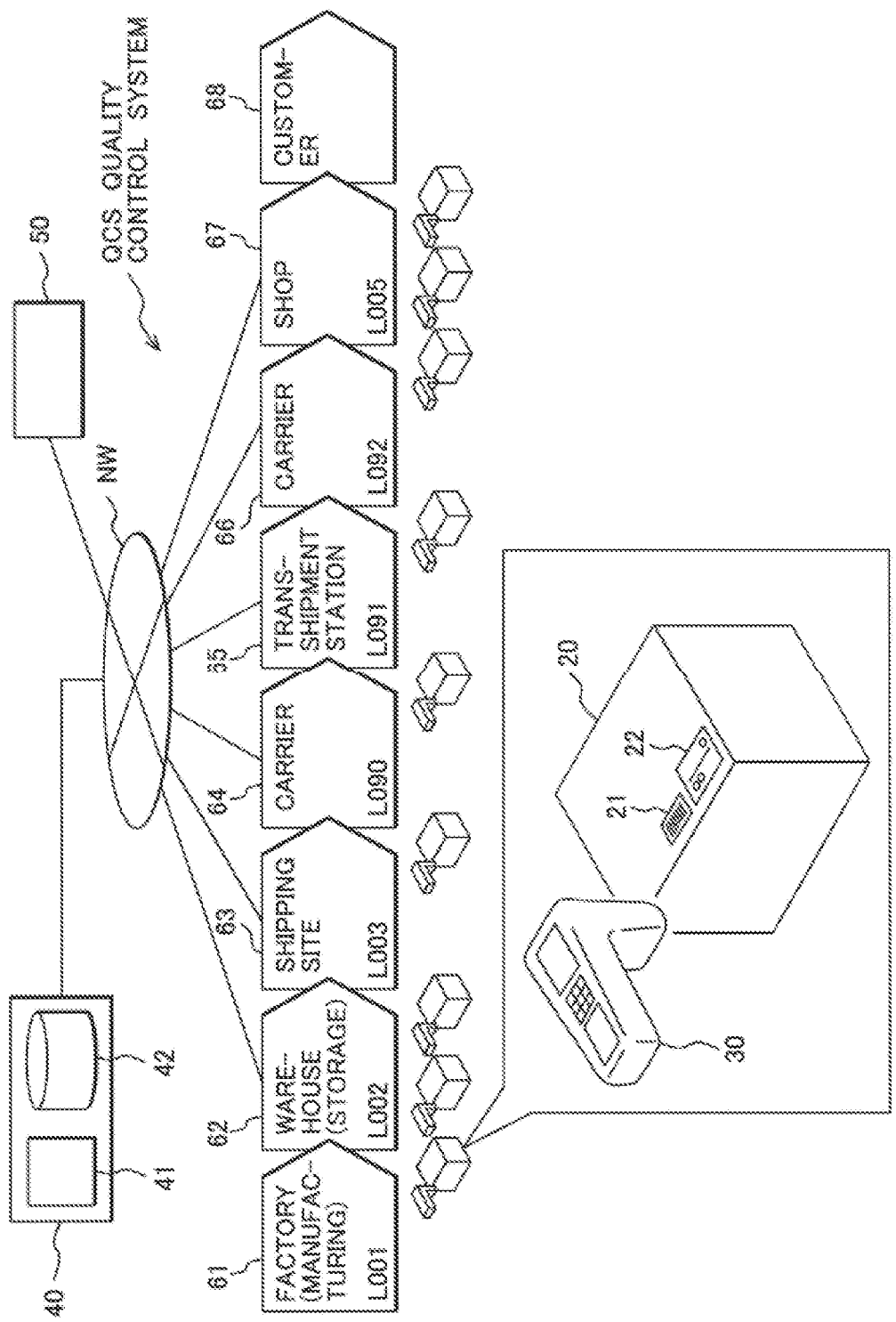
FIG. 10 is a view showing a configuration of a quality control system.

A quality control system using a temperature detection material or a temperature indicator is explained hereunder. A quality control system includes a control device to control the environment where a product is placed and a control terminal to obtain the color tone information of a temperature detection material. The control terminal, upon acquiring color tone information, transmits the time when product identification information and the color tone information are acquired and whether or not a color has changed in an associated manner to the control device. FIG. 10 is a view showing the configuration of a quality control system. Here, explanations are made on the basis of quality control in a distribution route through which a product 20 manufactured at a factory 61 is transferred to a shop 67, managed at the shop 67, and successively delivered to a customer 68.

A quality control system QCS (product management system) includes: a quality control terminal 30 (management terminal) to acquire a code (product identification information) (for example, a barcode 21) and color tone information of a temperature indicator 22, those being attached to a product 20; a management server 40 (control device); and a manager terminal 50. The quality control terminal 30, the management server 40, and the manager terminal 50 are connected communicably through a network NW.

A distribution route includes a factory 61 to manufacture a product 20, a warehouse 62 to store the product 20, a shipping site 63, a carrier 64, a transshipment station 65 to transfer the product 20 to another carrier, a carrier 66, and a shop 67. At each place, a worker collects quality control data by using the quality control terminal 30.

The quality control data is collected at the times when the product 20 is manufactured at the factory 61, is stored in the warehouse 62, is delivered at the shipping site 63, is transported by the carrier 64, receives transshipment work at the transshipment station 65, is transported by the carrier 66, is received at the shop 67, and is stored at the shop 67 for sale and on other occasions.

At each place, a worker can visually check the temperature control status at each process and the temperature load status of the product 20 by checking the color tone of a temperature-indicating material. Further, the worker may preferably obtain numerical information as color tone in addition to the visual check.

The worker transmits the quality control information including the optical state and the image of the product 20 and the temperature-indicating material, the reading location, time, etc. to the management server 40 by using the quality control terminal 30 at each of the processes of shipment, transport, storage, etc.

The quality control terminal 30 is preferably used for reading the optical state of the temperature-indicating material. As a result, each person related to the distribution of the product 20 can: acquire the states of the product 20 to be managed at distribution processes as the numerical information of the color tone of the temperature-indicating material; and quantitatively control and share the numerical information. Here, as the numerical information of color tone, in addition to CIE color space such as L*a*b* or L*C*h*, RGB color space, HSV color space, Munsell color space, etc. are named.

At the shop 67, the temperature control status after the processes of the transport and others from the factory shipment and the temperature load status of the product 20 can be checked visually by checking the color tone state of the temperature-indicating material of the transported product 20. Further, it is possible to check information including quality control information 426 until the delivery of the product 20 by being connected to a server 200 through the quality control terminal 30 or the like.

The quality control terminal 30: judges whether or not quality is maintained on the basis of the product identification information of the barcode 21 and the color tone information of the temperature indicator 22; and displays the judgment result. The worker checks the result. Meanwhile, the quality control data including the judgment result is transmitted to the management server 40 and stored in the management server 40 as the quality control information 426.

In the present embodiment, the quality judgment of whether or not quality is maintained is processed on the side of the quality control terminal 30. This is to avoid the concentration of the judgment process and the like and disperse the judgment process in a system for many products. If the processing capacity of the management server 40 is large, the quality judgment may be processed on the side of the management server 40.

Figure 11:
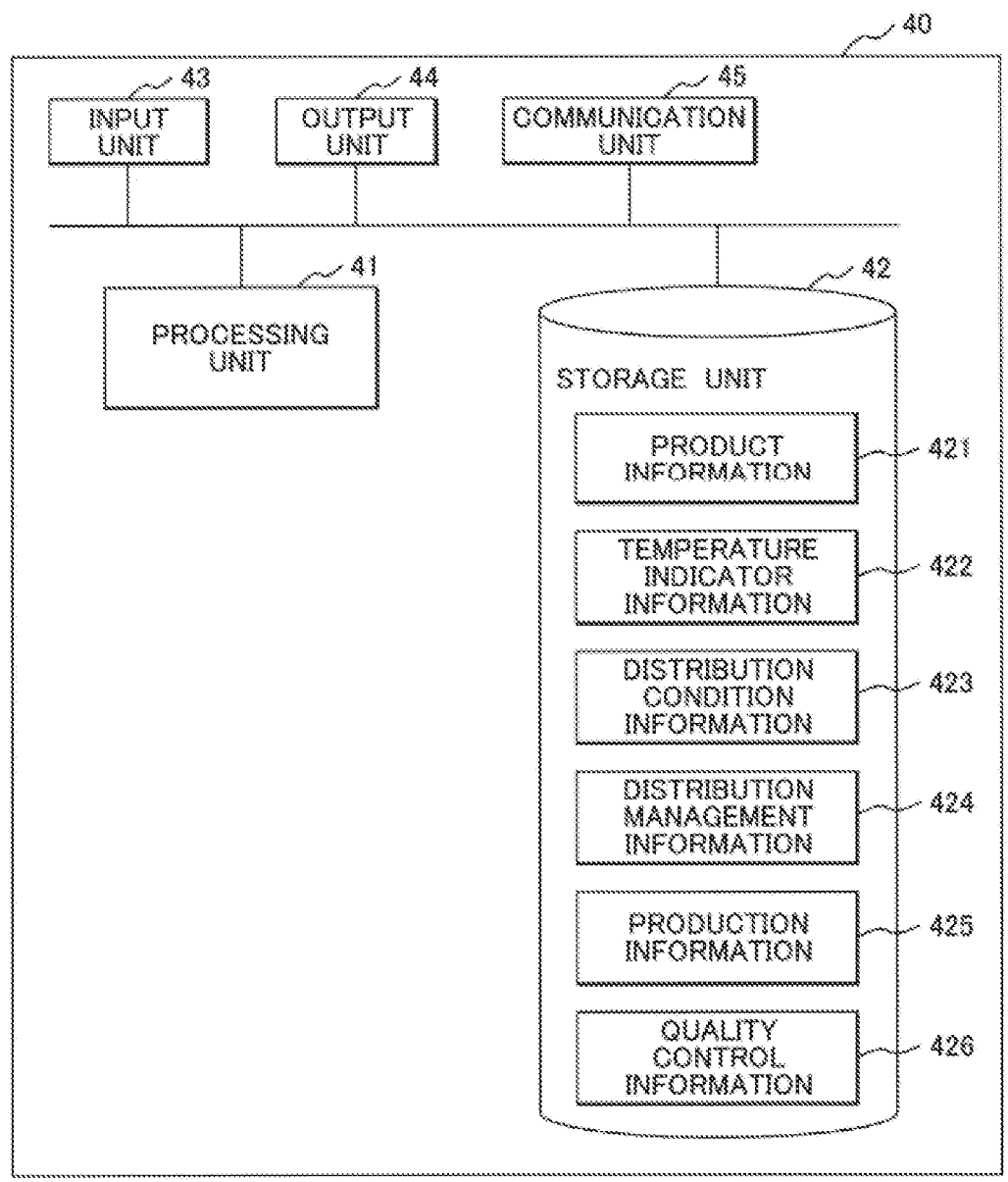
FIG. 11 is a view showing a configuration of a management server.

FIG. 11 is a view showing the configuration of a management server. A management server 40 includes a processing unit 41, a storage unit 42, an input unit 43, an output unit 44, and a communication unit 45. In the storage unit 42 of the management server 40, product information 421, temperature indicator information 422, distribution condition information 423, distribution management information 424, production information 425, quality control information 426, etc., which are detailed information of each product to be managed, are stored. The management server 40 gives and receives information to and from the quality control terminal 30 and, when the quality of the product 20 to be managed is judged as "attention" or "stop", notifies the judgment to the manager terminal 50. A manager having received the notification through the manager terminal 50 attracts attention to the distribution of products, holds the product, and takes other necessary actions.

Example 1

(Manufacturing Temperature Detection Material)
2'-methyl-6'-(N-p-tolyl-N-ethylamino)spiro[isobenzofuran-1(3H),9'-[9H]xanthene]-3-one (RED520 made by YAMADA CHEMICAL CO., LTD.) of 1 part by weight as a leuco dye, octyl gallate made by Tokyo Chemical Industry Co., LTD. of 1 part by weight as a color developer, Vitamin K4 made by Tokyo Chemical Industry Co., LTD. of 100 carts weight as a color eraser, and High Wax NP105 made by Mitsui Chemicals, Inc. of 100 parts by weight as a matrix material were used.

The leuco dye, the color developer, the color eraser, and the matrix material were mixed, the mixture was melted at 150° C. that is higher than the melting points of the color eraser and the matrix material, and the molten mixture was poured into a recess of an acrylic plate, the recess being formed by working the acrylic plate. By naturally cooling the poured mixture, a temperature detection material having a phase separation structure was manufactured.

(Check of Temperature History Display Function)
A manufactured temperature detection material was placed in the environment of 10° C. or higher and resultantly it was verified that the color turned red after one hour. Further, the temperature detection material once discolored was placed in the environment of 0° C. and resultantly it was verified that the discolored state was maintained.

Furthermore, the discolored temperature detection material was heated at 120° C. that was not lower than the melting point of the color eraser and not higher than the melting point of the matrix material for 10 minutes and resultantly it was verified that the discolored state returned to the original state.

Example 2

(Manufacturing Temperature Detection Material)
A temperature detection material was manufactured similarly to Example 1 except that 3,3-bis(p-dimethylaminophenyl)-6-dimethylamino phthalide (CVL made by YAMADA CHEMICAL CO., LTD.) of 1 part by weight as a leuco dye, octyl gallate made by Tokyo Chemical Industry Co., LTD. of 1 part by weight as a color developer, a material obtained by mixing methyl p-toluate and 2-phenylethyl phenylacetate at a weight ratio of 9:1 of 100 parts by weight as a color eraser, and High Wax NP105 made by Mitsui Chemicals, Inc. of 100 parts by weight as a matrix material were used.

(Check of Temperature History Display Function)
A manufactured temperature detection material was placed in the environment of −10° C. or lower and resultantly it was verified that the color turned blue after one hour. A manufactured temperature indicator was placed in the environment of −20° C. or lower likewise and resultantly it was verified that the color turned blue after 10 minutes.

Further, the temperature detection material once discolored was placed in the environment of 0° C. and resultantly it was verified that the discolored state was maintained. Furthermore, the discolored temperature detection material was heated at 120° C. that was not lower than the melting point of the color erase and not higher than the melting point of the matrix material for 10 minutes and resultantly it was verified that the discolored state returned to the original state.

From the above, it was verified that a temperature detection material excellent in handleability could be provided through a simple step by dispersing a temperature-indicating material in a matrix material including a nonpolar material and thus forming a phase separation structure.

REFERENCE SIGNS LIST

1 . . . temperature detection material,
2 . . . composition of leuco dye, color developer, and color eraser,
3 . . . matrix material,
4 . . . base material, 5 . . . transparent base material,
6 . . . spacer,
7 . . . printing paper,
8 . . . heat-insulating layer,
9,10,11 . . . temperature detection material,
12,13,14 . . . temperature detection display,
20 . . . product,
21 . . . barcode,
22 . . . temperature indicator,
30 . . . quality control terminal (management terminal),
40 . . . management server (control device),
41 . . . processing unit,
42 . . . storage unit,
421 . . . product information,
422 . . . temperature indicator information,
426 . . . quality control information,
50 . . . manager terminal,
NW . . . network,
QCS . . . quality control system (product management system)

The invention claimed is:

1. A temperature indicator comprising a base material and a temperature detection material arranged over the base material,
wherein the temperature detection material includes a leuco dye, a color developer, a color eraser, and a matrix material,
wherein the matrix material is a nonpolar material;
a melting point of the matrix material is higher than a melting point of the temperature-indicating material;
the matrix material has energy δd caused by dipole interaction among molecules estimated by a Hansen solubility parameter and energy δh caused by hydrogen bond among molecules of 3 or less, respectively;
the color eraser has energy δd caused by dipole interaction among molecules estimated by a Hansen solubility parameter and energy δh caused by hydrogen bond among molecules of 1 to 10, respectively;
the matrix material is 1 to 10 parts by weight with respect to the temperature-indicating material of 1 part by weight;
a phase separation structure in which the temperature-indicating material disperses in the matrix material is formed;
the color eraser is a material crystallizing hardly to the extent of forming an amorphous state while cooling naturally from a state of melting at a melting point of the color eraser or higher;
the temperature-indicating material melts and erases the color at an initialization temperature, which is the melting point of the temperature-indicating material, and maintains the colorless state by maintaining the amorphous state when cooled from a molten state above the melting point to a glass transition point and detecting temperature deviation by developing color at a crystallization start temperature higher than the glass transition point.

2. The temperature indicator according to claim 1, further comprising a transparent base material,
wherein the base material, the temperature detection material, and the transparent base material are stacked in this order.

3. The temperature indicator according to claim 2,
wherein the base material or the transparent base material includes a heat-insulating material.

4. The temperature indicator according to claim 2,
wherein a thermal conductivity from the base material to the temperature detection material is different from a thermal conductivity from the transparent base material to the temperature detection body.

5. The temperature indicator according to claim 1,
wherein the matrix material is in a solid state at an operating temperature of the temperature detection material.

6. The temperature indicator according to claim 1,
wherein the matrix material includes only hydrocarbon.

7. The temperature indicator according to claim 6,
wherein the matrix material is any one of paraffin wax, microcrystalline wax, polyolefin, and terpene resin.

8. The temperature indicator according to claim 1,
wherein the temperature detection material contains the matrix material of 1 to 10 parts by weight with respect to the temperature-indicating material of 1 part by weight.

9. The temperature indicator according to claim 1,
wherein the temperature detection material further includes any one of a dye, a pigment, a heat storage capsule, and a conducting agent.

10. The temperature indicator according to claim 1,
wherein the base material is a continuous porous material; and
the temperature detection material is impregnated in the continuous porous material.

* * * * *